United States Patent [19]

O'Donnell et al.

[11] Patent Number: 4,989,143

[45] Date of Patent: * Jan. 29, 1991

[54] ADAPTIVE COHERENT ENERGY BEAM FORMATION USING ITERATIVE PHASE CONJUGATION

[75] Inventors: Matthew O'Donnell, Schenectady, N.Y.; Stephen W. Flax, Wauwatosa, Wis.

[73] Assignee: General Electric Company, Schenectady, N.Y.

[*] Notice: The portion of the term of this patent subsequent to May 10, 2006 has been disclaimed.

[21] Appl. No.: 132,079

[22] Filed: Dec. 11, 1987

[51] Int. Cl.$^5$ .............................................. G01N 29/00
[52] U.S. Cl. ............................ 364/413.25; 128/661.01; 73/625
[58] Field of Search ....................... 364/413.25, 413.13; 128/661.01; 73/625, 626

[56] References Cited

U.S. PATENT DOCUMENTS

| 4,809,184 | 2/1989 | O'Donnell et al. | 128/660.01 |
| 4,817,614 | 4/1989 | Hassler et al. | 73/625 |
| 4,835,689 | 5/1989 | O'Donnell | 364/413.25 |

Primary Examiner—Jerry Smith
Assistant Examiner—David Huntley
Attorney, Agent, or Firm—Marvin Snyder; James C. Davis, Jr.

[57] ABSTRACT

A method for iterative phase conjugation adaptive reduction of phase aberration effects upon the time delays necessary for formation of a beam of coherent energy focused within non-homogeneous medium at a selected range R from, and at an angle $\theta$ with respect to the normal to, the surface of an array of a plurality N of transducers, each for providing a portion of the energy of the beam when excited and for converting energy reflected thereto to a signal therefrom, first bounces from a large collection of scatterers, contained in a portion of the medium to be investigated, a probe beam for that beam angle $\theta$. The received signals from each of the $(N-1)$ pairs of adjacent transducers are cross-correlated to drive a like number of phase conjugation correction signals, which are then arithmetically operated upon to provide a time correction for the time delay associated with each probe beam transducer, for that range R and angle $\theta$. The time correction for each transducer then modifies each of at least one iteration of excitation to, and return signal received from, the media portion. A plurality of iterations, with each excitation made with the most recent corrected delays values, better focuses the interrogating beam, until, after a selected number of iterations, actual imaging data can be obtained with minimal phase aberrations.

26 Claims, 5 Drawing Sheets

Fig. 2

ADAPTIVE COHERENT ENERGY BEAM FORMATION USING ITERATIVE PHASE CONJUGATION

BACKGROUND OF THE INVENTION

The present invention relates to coherent energy beam imaging and, more particularly, to a novel method for improved adaptive formation of the coherent beam, using iterative phase conjugation, to counteract the effects of inhomogeneous wave propagation.

It is well known that phase cancellation effects, introduced by inhomogeneous wave propagation in a medium, limit both the spatial and contrast resolution of images derived from a beam of coherent energy, such as a beam of radar, sonar or ultrasound energy and the like. Phase cancellation effects are most acute for high frequency imaging using large apertures, (i.e. for large numerical apertures) where small arrival time differences over substantial distances result in large errors in the relative phase across that aperture. For example, in medical ultrasound this occurs because the phase of an interrogating ultrasound wave is distorted due to inhomogeneous distribution of sound velocities in the body through which the ultrasound wave propagates, from the aperture to the region of interest and the subsequent return to the aperture. It is well known that this effect can dominate the appearance of an ultrasound image as both the ultrasonic frequency and the size of the aperture are increased. While several methods have previously been proposed for reducing phase cancellation effects, all such methods operate, if at all, at the expense of spatial resolution. In order to image at the theoretical resolution of the aperture, especially at high frequencies, phase distortion of the incident ultrasound wave must be reduced. In ultrasound imaging, the predominant distortion occurs within the wall of the body being imaged, which can be modeled as a single distorting surface. For all regions of interest deeper than this body wall, it is highly desirable to reduce phase aberration by obtaining accurate information from which phase correction can be computed. This goal was attained using a method for the phase conjugation adaptive reduction of phase aberration effects upon the time delays necessary for formation of a beam of coherent energy focused within a non-homogeneous medium at a selected range R from, and at an angle $\theta$ with respect to the normal to, the surface of an array of a plurality N of transducers, each for providing a portion of the energy of the beam when excited and for converting energy reflected thereto to a signal therefrom, as described and claimed in copending U.S. application Ser. No. 099,422, filed Sept. 21, 1987, now U.S. Pat. No. 4,835,689, issued May 30, 1989, assigned to the assignee of the present invention; and incorporated herein in its entirety by reference. In that application, the method comprised the steps of bouncing a probe beam, derived from the entire array of transducers, from a large collection of scatterers, contained in a portion of the medium to be investigated; cross-correlating, for each probe beam, the received signals from each of the $(N-1)$ pairs of adjacent transducers to derive a like number of phase conjugation correction signals; arithmetically operating upon the plurality of phase conjugation correction signals to provide a time correction for the time delay associated with each probe beam transducer, for that range R and angle $\theta$; modifying by the time correction for that transducer the time delay used for formation of an actual imaging excitation beam; and then modifying by the time correction for that transducer the time delay of return signals, received from the media portion to be investigated, to reduce phase aberration in the resulting image. The resulting corrected image, while better than an uncorrected image, still leaves something to be desired in the way of further phase aberration reduction, especially where very large initial phase distortion is encountered.

BRIEF SUMMARY OF THE INVENTION

In accordance with the invention, phase error correction is carried out as an iterative process. The first probe beam, for a particular angle $\theta$-range R combination, provides an initial phase conjugation correction signal $\phi_{j1}$ for each associated j-th channel, where $1 \leq j \leq (N-1)$, in the imaging apparatus. This correction signal iteratively modifies both the transmitted excitation of a next probe beam and the received energy responsive to that modified next probe beam and reflected from the random scatterers of the media. The new received energy is now cross-correlated to derive a new set, one per channel (except for the last (N-th) channel), of phase correction signals $\phi_{jw}$, where $1 < w \leq L$ and L is the total number of iterations ($L<1$), with the new correction signals for the w-th iteration being added to the previous correction signal stored in that channel to provide an improved data set with less phase aberration and therefore, a better estimate of actual phase-error. A total L iterations (with $L=3$ or $L=4$ presently being preferred) reduces the actual phase error even further. Thus, our improved method uses iterative modifications of the time delays used to focus the energy beam, on both transmission and reception, to progressively narrow the beam toward the point-like configuration which would be obtained if no phase aberration were present.

Accordingly, it is an object of the present invention to provide a novel method and apparatus for improved adaptive beam formation utilizing iterative phase conjugation.

This and other objects of the present invention will become apparent upon a reading of the following detailed description, when considered in conjunction with the drawings.

BRIEF DESCRIPTION OF THE DRAWINGS

FIG. 2, which includes FIG. 2a and FIGS. 10a-10d, is a schematic block diagram of a portion of an ultrasound imaging system utilizing our novel method of phase conjugation for improved adaptive beam formation to reduce phase distortion.

DETAILED DESCRIPTION OF THE INVENTION

Figure 1:
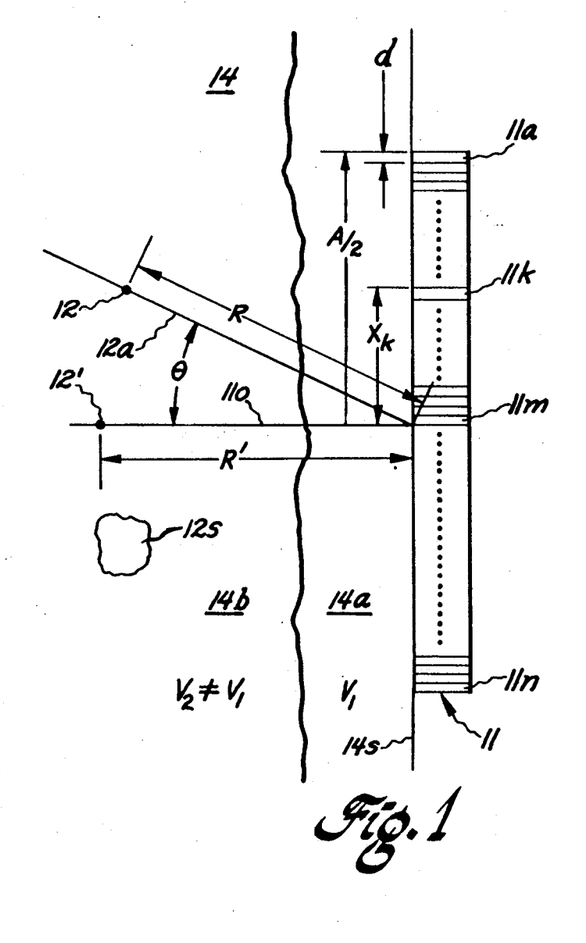
FIG. 1 is a plane view of a transducer array and of a two-layer object to be investigated with an energy beam produced by the array, and useful in defining the problem to be overcome by the present invention.
Figure 1A:
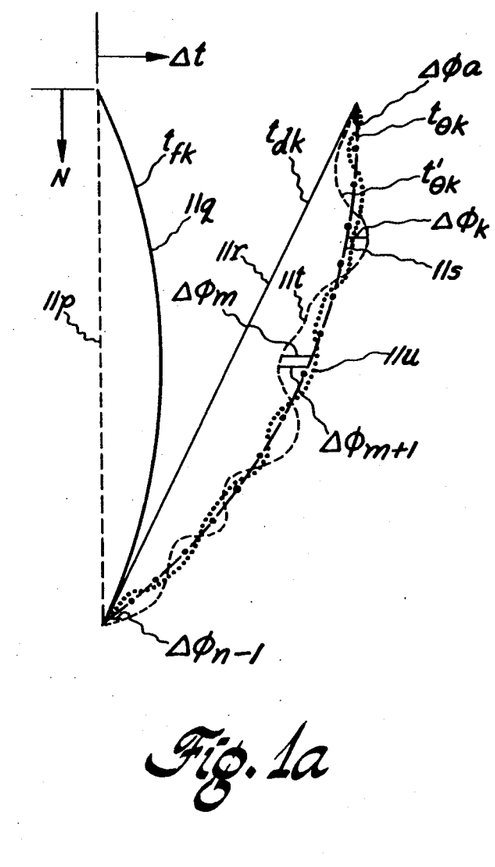
FIG. 1a is a diagram relating transducer element number k versus time delay $\Delta t$, for various observation conditions and useful in understanding several factors concerning the phase aberrations encountered at the output of the transducer array.

Referring initially to FIGS. 1 and 1a, an investigative system 10, utilizing a beam of energy for interrogation of an object, has an array 11 of energy transducers.

Array 11 is illustrated as a linear array of a plurality N of transducers $11a, \ldots, 11k, \ldots, 11m, \ldots, 11n$. The transducers have a center-to-center spacing d, with each transducer at a distance $x_k$ from the array centerline $11o$, so that the array extends in both directions for an aperture distance A/2 from the array centerline $11o$. The array is utilized both to transmit a beam of energy and to receive a return energy response, from a reflector 12, generally positioned along a line $12a$ at some angle $\theta$ with respect to the normal line $11o$ perpendicular to the plane of array 11. It is well known that, where array 11 is pressed against the surface $14s$ of a homogeneous medium 14, the waveform from a reflective location $12'$, substantially on the array midaxis line $11o$ and at a range $R'$ sufficiently large with respect to the array aperture A, will arrive substantially simultaneously at each of the array transducers $11k$ ($a \leq k \leq n$); this waveform $11p$ (FIG. 1a) thus requires no timing offsets $\Delta t$ at each of the N transducers, i.e. the transducer outputs can all be directly coherently summed to form the beam at angle $\theta = 0$. It is also well known that as the range $R'$ decreases, the sensors closest to the array center, e.g. one of the pair of central sensors $11m$, where the array has an even number of sensors $N=2m$, requires a greatest time delay $\Delta t$ than the time delay required by transducers further toward the ends of the array. Thus, to properly focus a beam of energy at a location $12'$ at a substantially arbitrary range $R'$, a focusing time delay $t_{fk} = (A^2/8R'V) \cdot (1 - [2x_k/A]^2)$, illustrated by the focusing correction curve of FIG. 1a, is required to be physically present after each k-th transducer $11k$. It is further known that if the beam is steered to a general location 12 at some angle $\theta$ with respect to the midarray orthogonal axis $11o$, even at a very large range R, the reflected beam wavefront will first reach that transducer at the end of the array nearest to the angularly-offset location, e.g. here the transducer $11a$, and will then progressively reach each successive one of the other transducers in the array, until the transducer at the furthest end therefrom is reached, e.g. here the transducer $11n$. A substantially linear curve $11r$ of transducer delay time $t_{dk} = t_{cm} + (k-1)(d/V)\sin\theta$ must be provided (where $t_{cm}$ is a midarray element m delay time chosen to be slightly greater than $(md/V)\sin\theta$, so that all $t_{dk}$ are positive, and $\theta$ is now defined as a negative angle if "above" line $11o$); $t_{dk}$ is provided to increasingly delay the output of each transducer from the nearest end to the furthest end of the array. When an off-axis point 12, at angle $\theta$ and relatively close range R is to be imaged, both the focusing and the angular steering corrections must be made, such that the individual total time delay $t_{\theta k}$, for each transducer k, is given by:

$$t_{\theta k} = t_{cm} + (k-1)(d/V)\sin\theta + (A^2/8RV)(1-[2x_k/A]^2)\cos^2\theta$$

and is shown by chainline curve $11s$. However, this is true only if the medium 14 is substantially homogeneous between the transducer array 11 and the point 12 to which the energy beam is steered.

If the medium is not homogeneous, as might occur if first encountered layer $14a$ has a first velocity of energy propagation $V_1$ and a second encountered layer $14b$ has a second propagation velocity $V_2$ (different than first layer properly focusing and steering the beam to any point 12 depends upon the extent of the non-homogeneous medium layer $14a$ intervening between a particular transducer $11k$ and any point 12 in the sample under investigation. That is, the time delay curve $11t$ is, if ascertainable at all, extremely nonlinear and requires, for each transducer a total transducer time delay $t'_{ok}$ which not only includes the focusing and delay times $t_{fk}$ and $t_{dk}$ but also requires an additional time delay $\Delta t_{k\theta}$ to counteract the phase distortion $\Delta\theta_k$ which the energy returning to each transducer k has been subjected to by crossing different thicknesses of at least layer $14a$. If the particular point 12 could be made to function as a point source, then the amount of phase distortion $\Delta\theta_k$ that each transducer k has been subjected to could be determined. Thus, the first transducer $11a$ would have a phase distortion $\Delta\phi_a$ such that the total delay time associated with that transducer must be changed from that value $t_{a\theta}$ given by the ideal curve $11s$, while other transducers may require a time delay $\Delta\phi_k$, which modifies the ideal time delay given by curve $11s$. In addition, because of the inhomogeneous propagation velocity distribution in layer 14, the amount of phase distortion $\Delta\phi_m$ at any one transducer need have no relationship to the phase distortion $\Delta\phi_{m+1}$ at the next adjacent transducer. It is highly desirable to measure the phase distortion and compute correction factors for use in establishing the time delay associated with each transducer $11k$ of the array. A single insonification with a probe beam of transmitted energy from transducer array 11 and reflection from any scattering means $12s$ (and especially a large distribution of scatterers) in layer 14, as described and claimed in the above-mentioned copending application, allows an estimate of the phase aberrations, or distortion pattern, induced by propagation through a spatially inhomogenous medium, to be obtained and then used to at least partially correct the required time delays in a sampled-aperture coherent imaging system.

We have now found that there is a tendency to underestimate coherent phase errors when the reflected signal is coming from a broadly insonified region of random scatterers. Since the focal integrity at a given location in space directly relates to the size of the insonified region, the more an energy beam is defocussed in a spatial region, the more difficult an accurate estimation of the phase errors in that region become, and, therefore, the more difficult is correction of those phase errors. The initial phase correction data is applied to another probe of transmission excitation energy, in addition to the reflected received energy therefrom, to further narrow the focus of the excitation beam in that subsequent probe. By manipulation of the transmission signal phase, as well as the received signal phase, the improved (i.e. smaller) transmit beam profile causes the sampled region to itself provide a better estimate of the actual error. The new error estimate is now the residual difference between the initial underestimate and a second estimate based upon the smaller sample area. This residual error is added to the original measured error and yields an even better phase distortion correction signal approximation, as shown by the (dotted) new time delay curve $11u$. Thus, even though the initial measurement was not perfect, it is possible to iteratively reduce phase errors. Effectively, the transmit beam focal spot size is improved with each iteration; each focal spot size improvement makes possible a better estimate of the phase errors in that illuminated region of reduced size, so that the process simply continues until either no further improvement in the focal spot is achieved (at which point the detected error becomes negligible) or until a predetermined number L of iterations have occurred (in the case where comparison of the actual error versus some error criterion cannot be made). It will be seen that in the previous one-probe phase manipulation case, the first estimate is the only estimate of phase aberration. It will also be seen that this improved technique will always converge in a stable manner, as any sample region larger than a point will always underestimate the correction that is needed to drive the excitation beam toward a point, so that any given correction will always be an undercorrection and, as a result, will always be stable. As the sample region becomes more "point like", the residual errors become smaller and smaller, but are never fully able to correct the remaining error, so that the system is underdamped and does not oscillate.

Figure 2:
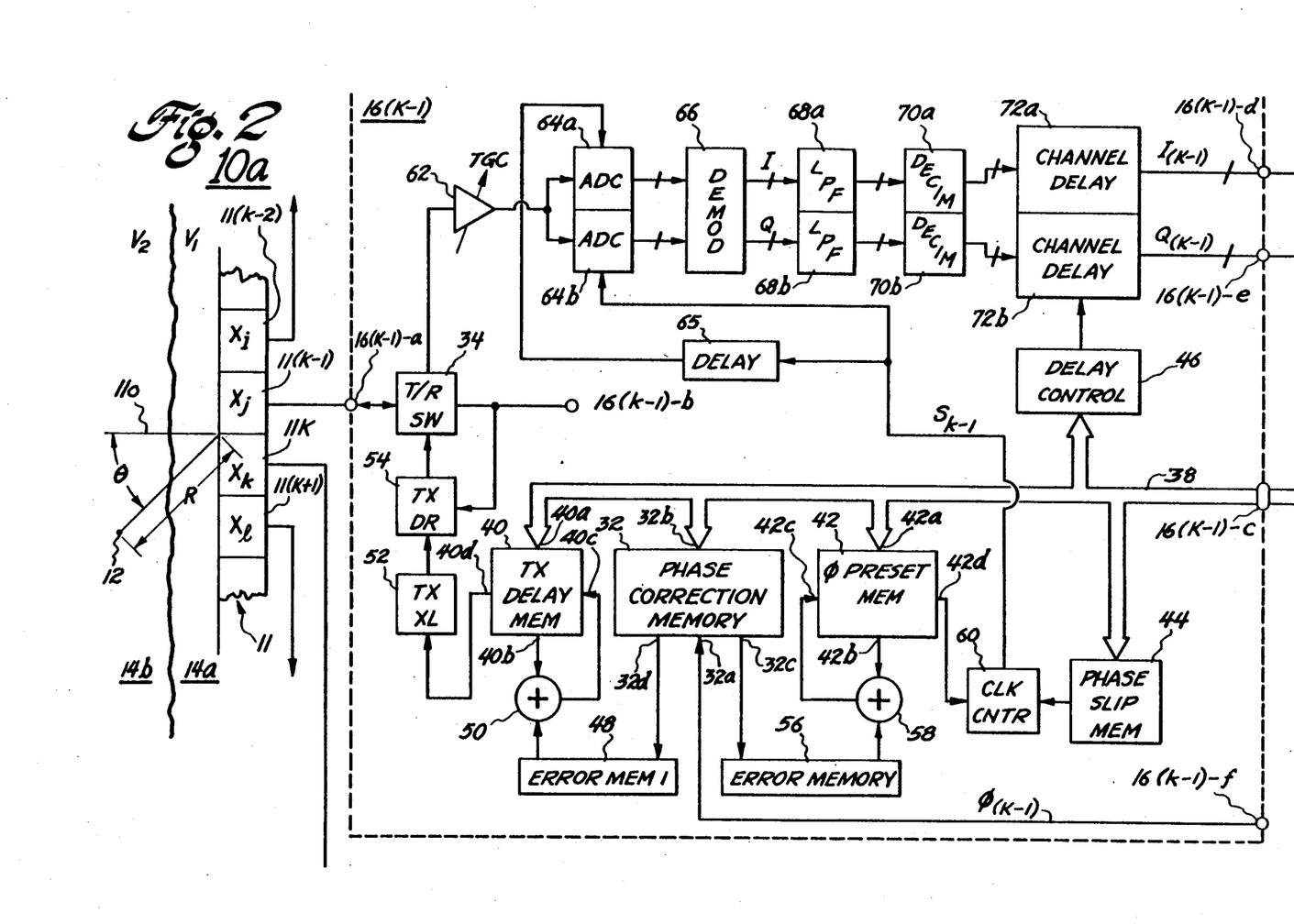
Figures 2, 2A:
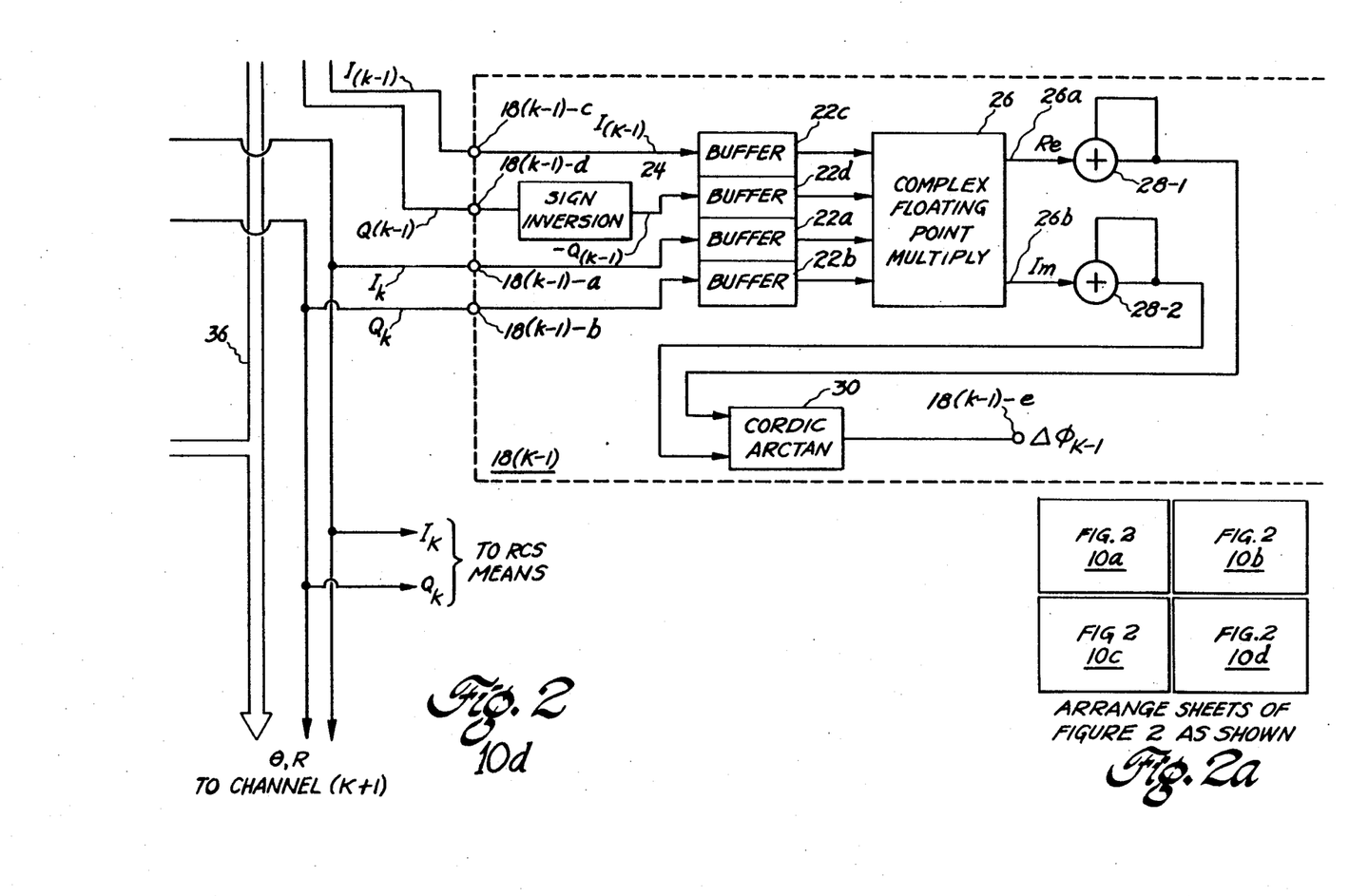

Referring now to FIG. 2, for an exemplary ultrasonic energy imaging system 10, the beam 12a can be steered, focused and adaptively formed to substantially overcome phase distortion effects, utilizing the iterative phase conjugation method of our invention. As is well known, each of the transducers 11k has associated therewith a front end portion 16k containing (a) means for exciting the transducer to transmit an interrogation beam, and (b) means for processing received energy from the transducer to form a reception beam. As described in the aforementioned copending application, associated with all-but-one of the front end means 16k is a phase conjugation processing means 18k for determining the phase distortion $\Delta\phi_k$ between the return signal in that channel and the return signal in an immediately adjacent channel. All N transducers also convert the returned probe beam energy received thereat to an electrical signal, for processing in means 16, 18 and 20 to yield a phase distortion correction data value $\phi_k$, and thus a phase conjugation correction time delay $\Delta t_{k\theta} = \phi_{k\theta}/\omega_0$, for that one channel k at the a probe beam direction $\theta$. As there are N channels to be compared in successive pairs, only (N−1) phase aberration signals $\Delta\phi$ will be generated. Means 20 is provided for computing the individual channel j phase conjugation correction signals $\phi_j$ responsive to receipt of the individual transducer phase distortion quantities $\Delta\phi_k$. Thus, each phase difference results in a time delay error, due to inhomogeneous propagation within the medium, where the time delay error $\Delta t_j$ for the j-th channel and beam angle $\theta$ is at $\Delta t_{j\theta} = \phi_{j\theta}/\omega_0$, where $\omega_0$ is the frequency of the beam energy used for interrogation of the medium, and $$\phi_{j\theta} = \sum_{k=1}^{j} \Delta\phi_k$$

for the j-th transducer transmitting. Means 20 for computing the $\phi_j$ value can be any suitable microcomputer having associated random access memory RAM means 20a and stored program read-only memory ROM means 20b; microcomputer 20 operates to sum all of the $\Delta\phi_k$ quantities, as might be provided at a multiplexible microcomputer means input 20c, responsive to receipt of an enable signal and a channel j number at a control interface 20d.

In accordance with one principle of our invention, means 20 also receives data setting the number L of iterations for beam probing, so that a total of L sequential probe cycles occur, each with an enablement of means 20 responsive to the transmission of a probe beam at an angle $\theta$, typically prior to the actual data-gathering beam transmission at the same angle $\theta$ or at an angle $\theta'$ close to angle $\theta$. A typical phased-array sector scanning (PASS) transducer array might scan through a 90° sector with $2^7 = 128$ different beams (with angular resolution therefor of about 0.7° per beam steering angle). If, to save time, all beam angles do not have probe beams sent therefrom and phase correction $\Delta\phi_k$ data calculated therefor, then probe beams for one out of every few consecutive beam numbers might be used. Thus, prior to accepting data for a beam at some angle $\theta$, a set of L iterative probe cycles occurs, in each of which a probe beam is sent out; each transducer is provided with that updated transmit delay which would be needed for forming all transducer outputs into a beam at the selected angle $\theta$ and range R.

Each of the L phase conjugation correction signals is a time delay, where the time delay error $\Delta t_{m\theta} = T_m - T_{m-1}$, for signals on a pair of adjacent channels m and (m−1) and where $T_m$ is the time interval from transmission of the probe beam by the designated transducer m, to return signal reception by the particular m-th transducer. Thus, the k-th channel signal is $S_k(t) = S(t - T_k)$ and the signal on the (k−1)-th channel is $S_{k-1}(t) = S(t - T_{k-1})$. If the pair of adjacent channel signals are converted to baseband and then cross-correlated, $$S_k(t) = C(t - T_k) \exp(-i\omega_0(t - T_k)),$$

and $$S_{k-1}(t) = C(t - T_{k-1}) \exp(-i\omega_0(t - T_{k-1})),$$

where C(t) is a probe beam envelope shape function, and the cross-correlation function R(t) is given by $$R(t) = \int_{-\infty}^{+\infty} S_k(t + t') S_{k-1}(t') dt'.$$

This is equivalent to $$R(t) = \exp(-i\omega_0(t - (T_k - T_{k-1}))) \int_{-\infty}^{+\infty} C(t + t' - T_k) C(t' - T_{k-1}) dt'.$$

However, it will be seen that the integral is just the autocorrelation function A of the envelope (env) evaluated at time $(t - (T_k - T_{k-1}))$. Therefore, the baseband cross-correlation function becomes $$R(t) = \exp(-i\omega_0(t - (T_k - T_{k-1}))) A(t - (T_k - T_{k-1})),$$

so that the phase of the cross-correlation function, at any time t, is related to the time error as $\phi(t) = -\omega_0(t - \Delta t)$. Therefore, if $\phi(t)$ can be measured at any time wherein $A(t - \Delta t)$ is large, a very good estimation of the time error will be obtained. Since the time shift $\Delta t$ is relatively short compared to the envelope duration T, i.e. $\Delta t << T$, then $A(t - \Delta t)$ is very near maximum at time $t = 0$. Therefore, a measurement of the phase at $t=0$ is given by $\Delta\phi_k(0) = \omega_0 \Delta t_k$, so that $\Delta t_k = \Delta\omega_k(0)/\omega_0$, will be the optimum estimate of the required time shift $\Delta t_k$. The baseband signal is typically obtained as a pair of signals, i.e. an in-phase I baseband signal and a quadrature-phase Q baseband signal, having a $t=0$ cross-correlation function $$R_k(O) = \int_{-\infty}^{+\infty} [[I_k(t') + iQ_k(t')][I_{k-1}(t') - iQ_{k-1}(t')]dt,$$

so that, for a sampled system, $$R_k(O) = \sum_{m=1}^{M} [I_k(m) + iQ_k(m)][I_{k-1}(m) - iQ_{k-1}(m)]$$

and $$\Delta\phi_k(0) = arctan(Im(R(0))/Re(R(0))),$$

where M is the number of sample points used to approximate the infinite time integral. Therefore, the $\Delta\phi_k$ calculations can be carried out by computing the cordic arctangent of R(0), i.e. by accumulating the real and imaginary parts of the result of a complex multiplication between the baseband signals on two adjacent channels k and (k−1), to form $R_k(0)$ in each of the (N−1) means 18, and then accumulating the imaginary and real parts of all $R_k(0)$ terms to form R(0), from which the ratio of Im(R(0)) to Re(R(0)) is calculated in means 20, to derive each correction data $\Delta\phi_k$.

Each means 18 comprises a set of buffer means 22 for temporarily storing the I and Q data from each of the involved two adjacent channels; a sign inversion means 24 for inverting the sign of the Q data from the first channel, prior to storage of that data in buffer means 22d; a complex floating point multiplication means 26; a pair of adders 28-1 and 28-2; and a cordic arctan computing means 30. Thus, means 18(k−2) is associated with the (k−2)-nd channel, or transducer, and receives from the next, e.g. (k−1)-st, front end means the in-phase $I_{(k-1)}$ data at a first input 18(k−2)-a, for storage in the first buffer means 22a, and the quadrature-phase $Q_{(k-1)}$ data at a second input 18(k−2)-b for storage in second buffer means 22b. Means 18(k−2) also receives the I and Q data from the associated (k−2)-nd channel, e.g. the last channel in-phase $I_{(k-2)}$ data is received at input 18(k−2)-c for storage in third buffer means 22c, and the last channel quadrature-phase $Q_{(k-2)}$ data is received at input 18(k−2)-d, is sign inverted in means 24, and the $-Q_{(k-2)}$ data is stored in fourth buffer means 22d. The complex floating point multiplier means 26 in the k-th means 18k utilizes the four data quantities in buffer means 22 to provide the real Re and imaginary Im portions of the quantity $([I_k(j)+iQ_k(j)][I_{k-1}(j)-iQ_{k-1}(j)])$, at respective outputs 26a and 26b for finding each of the constituents of the R(0) summation. The real or imaginary parts are each summed in one of real term summer means 28-1 or imaginary term summer means 28-2. The summed signals are provided to the cordic arctan means 30 which provides the $\Delta\phi_k$ data to output 18k-e. It is these $\Delta\phi_k$ data terms which are accepted in sequence by the multiplexing microcomputer means input port 20c, for calculation of the $\phi_{j\theta}$ value for each of the $1 \leq j \leq N$ channels, for each of the L iterations at a particular $\theta$-R combination. Memory means 32, 40 and 42 are cleared prior to new data being introduced at the commencement of a probing sequence for a new $\theta$-R combination. New $\phi_{j\theta}$ information is fed back to the phase correction data input terminal 16j-f of the selected j-th front end means for each of the iterations w, where $1 \leq w \leq L$, and will be added, in means 56 or 58, to the present contents of Read-Modify-Write memory means 40 or 42, to determine the present phase correction value $\phi_{jw}$. That is a present correction time $\Delta t_{jw} = \phi_{jw}/\omega_o$, calculated from this $\omega_{jw}$ data, entered into the channel phase correction memory means 32 via a first input port 32a thereof. Similarly, the phase correction memory means 32 of the k-th channel receives the $\Delta t_{jw}$ data provided to that channel's phase correction data input 16k-f terminal. Prior to discussing use of the present-iteration correction time data, a brief description of front end means 16 will be given.

Each channel front end means 16k, where $1 \leq k \leq N$, has a transducer node 16k-a connected to the associated k-th transducer 11k. A transmission pulse $T_xP$ control signal is applied to the transmission control input 16k-b of the channel means to switch the connection of transducer terminal 16k-a through a transmit/receive switch means 34 from a receive portion to a transmit portion of the channel front end means. With the exception of the dual-output phase correction memory 32, the error memory means 48 and 56, the associated adder means 50 and 58 and the associated Read-Modify-Write (RMW) delay memory means 40 and 42 to be discussed hereinbelow, all of the other channel front end means are well known in the art (see, e.g. co-pending applications U.S. Ser. No. 056,177 and U.S. Ser. No. 944,482, respectively filed June 1, 1987 and Dec. 19, 1986, now respectively U.S. Pat. Nos. 4,839,652 and 4,809,184, respectively issued June 13, 1989 and Feb. 28, 1989, assigned to the assignee of the present application and incorporated herein in their entireties by reference) and will be only briefly described herein. Each k-th channel front end means 16k has a data bus 16k-c input which receives angle $\theta$ and range R information from a system data bus means 36, so that a front end internal data bus 38 can route this information in parallel to: a second input port 32b of phase correction memory 32; a first input port of the transmission Tx delay RMW memory means 40; a first input port of the reception phase preset RMW memory means 42; a reception phase slip memory means 44; and a reception delay control means 46 in each channel. The transmission delay data, for forming energy from this k-th one of the N transducers into a beam focused on a small region 12 at angle $\theta$ and range R, comes from means 40.

In accordance with one principle of the present invention, each excitation phase correction signal $\phi_{tjw}$, for each iteration w, is converted into a corresponding delay time correction $\Delta t_{tjw}$ in means 32. The transmission delay time correction data is temporarily stored in error memory means 48, and, when the value stored in means 48 is changed, causes that new value to be then added, in adder 50, to the prior contents of Tx delay memory 40, as then available at a first output 40b. The sum is returned to the second input 40c, restored in RMW memory means 40 as the new Tx delay data and then forwarded only from the second data output port 40d to a transmission control (TX XL) means 52 for establishing the timing of the transmission pulse from a transmission driver (TX DR) means 54, which provides a transmission pulse of RF ultrasonic energy through T/R switch means 34, to the associated transducer 11k. When the Tx pulse at node 16k-b ends, the channel switches to the receive (Rx) mode of operation. The phase correction memory provides, for the w-th iteration, reception time delay $\Delta t_{rjw}$ data at an output port 32c; the data thereat is held for temporary storage in an error memory means 56. The received signal phase correction time $\Delta t_{rjw}$ is added, in adder means 58, to the phase preset data previously entered in memory means 42 for the particular angle $\theta$ and range R and then re-stored in RMW means 42, prior to a presentation at second output 42d. This data, plus the phase slip data from memory means 44, is loaded into a clock counter means 60, which provides a reception sample strobe clock signal $S_k$. The incoming RF signal is converted to digital data in ADC means 64 in each channel; this digital data is demodulated to baseband by a demodulation means 66, then low-pass-filtered in LPF means 68 and then decimated in digital data decimator means 70. The decimated data is then delayed in channel delay register means 72, which have a delay time $t_d$ established by the delay control means 46 for the particular channel, and provide the channel output in-phase $I_k$ data at channel output 16k-d or the channel quadrature-phase $Q_k$ data at channel output 16k-e. This data is used to calculate the next phase distoration correction delay values $\Delta t_{tj(w+1)}$ and $\Delta t_{rj(w+1)}$, for the next iteration (w+1). This iterative process continues until the L-th iteration is reached; thereafter, one additional excitation-response cycle occurs, which provides for the $\theta$-R combination, a set of $I_k$ and $Q_k$ data from which most of the phase distortion has been removed. It is this data that is forwarded to the RCS means (not shown) for providing the in-phase and quadrature-phase resulting-coherent-sum (RCS) data from which the displayable images are derived; the associated pair of processing means 18(k−1) and 18k ignore this data, as w is now greater than L, signifying that an actual data reading, and not a distortion-reducing iteration, is occurring.

In operation, a first probe beam (w=1) is formed by exciting all of the transducer elements with a time delay sequence corresponding to a beam steered to an angle $\theta$ and focused to a range R (provided via delay memory 40, transmission controller 52, and transmission driver 54) as if a completely uniform medium were being dealt with. During reception, as the complex correlator sums are computed by means 20, the receive-beam-forming electronics of each means 16 is continuously reconfigured for dynamic focus (provided via ADC means 64, digital baseband demod means 66, low pass filter means 68, decimator means 70, channel delay means 72, delay control means 46, phase slip memory means 44, and clock control means 60) so that the phase correction modification time $\Delta t_{jw}$ for each channel results substantially solely from propagation errors. Thus, the probe beam pulse is returned from the scatterers 12s within the actual, non-uniform media, and the individual signals on each of the plurality N of channels are each processed into an in-phase $I_m$ component and a quadrature-phase $Q_m$ component for each m-th channel thereof. These $I_m$ and $Q_m$ signals are then fed in pairs from means 16 into the plurality (N−1) of complex correlator means 18 to calculate the $\Delta\phi_k$ errors for each of the (N−1) pairs of adjacent channels. Means 20 receives and sequentially accumulates the $\Delta\phi_k$ errors to derive the phase correction factors $\phi_{jw}$ to be used in each of the N channels for the angle $\theta$ corresponding to the probe beam direction. This process occurs for all probe direction angles $\theta$. A first set of phase correction factors $\phi_{j1}$ are provided for w=1; these modify the delay values in both the RMW memories means 40 and 42. The next (second w=2) probe, at the same $\theta$R combination, uses these new delay values to modify with a more-focussed beam. This beam is then returned from the scatterers, received, processed and used to further modify the phase aberration correction time delays stored in memory means 40 and 42, preparatory to a next (third w=3) probe beam insonification. After L insonifications, at least one actual (data-gathering) insonification occurs, to obtain display data for that $\theta$R combination. Although a set of L probe beams can be provided in every beam direction in the corrected image, it should be understood that a probe beam set need not be provided in every beam direction. A single probe beam set (typically with L=3 to L=6) can be used to derive correction phases for all of the plurality N of elements over a set P (typically, with P=2 to P=16) of adjacent image beams. It should be understood that each of a plurality of substantially identical front-end integrated circuit chips will provide at least one front-end portion 16; it should also be understood that each of a plurality of substantially identical circuit processing chips will provide at least one cross-correlation processing portions 18. If the same number of front-end ICs and cross-correlation processor ICs are used, then each processing chip can be located adjacent to the front-end chip for the associated channel(s). The single microcomputer means 20 can be connected to the means 18 ICs with appropriate bus means. It will be understood that this arrangement allows all of the front-end chips to be substantially adjacent to the N transducers of array 11.

It will be seen that, in accordance with our improved iterative process, it is only after the system has caused the transducer array to provide a plurality L of probe beams at angle $\theta$ and all L modifications of the phase correction $\phi_{j\theta}$ data are implemented that the system controller causes all of the N channels to substantially simultaneously transmit excitation for that angle $\theta$ and range R, and to process the return signals, utilizing the iteratively- corrected phase distortion data in each channel to correct the phase distortion therein; the resulting I and Q signals are processed, by known means, to find resulting coherent sum (RCS) signals from which displayable images are formed. It will be understood that a plurality of insonifications at the same angle and range can be utilized, with the reduced-aberration RCS signals being averaged, if desired. As previously mentioned, in the interest of reducing the time required for probing at each of the multiplicity of angles $\theta$ (of which there could be e.g. $2^7 = 128$), each imaging excitation beam need not have a probe excitation beam issued therewith. For example, every other beam angle could be utilized for iterative probe beam excitation; the phase correction data for the intermediate imaging angles would result from interpolation of the adjacent probe beam angles. It should be understood that the greater the number of independent probe beam sets, generally the better the resulting phase aberration correction. It will also be understood that if the configuration of the layers 14 is time variable, as will usually be encountered in medical ultrasonic imaging wherein transducer array 11 rests up against an exterior surface of a portion of human anatomy which will be changing location with time (due to breathing, pulsatile blood flow, and the like phenomena) then storage of any correction factor (initial, intermediate or final) for all imaging angles is inappropriate (since these factors are likely to have changed between a first probe set insonification at a particular angle $\theta$ and a later probe set insonification at that same angle $\theta$) due to natural body movement, so that phase correction memory 32 need not be present, and the phase correction data from each probing is entered directly into error memory means 48 and 56, but is immediately discarded after the next imaging insonification (or the next V sequential insonifications, if a V-average technique is in use). Subsequent imaging insonifications at the same angle require that a new iterative probing process take place prior to the actual data-taking procedure, to find at that particular time the phase-correction data for each of the N channels.

While the presently preferred embodiment of our novel method and apparatus has been presented herein by way of explanation, many variations and modifications will now become apparent to those skilled in the art. For example, although the invention is described with respect to phasedarray ultrasound imaging, it should be understood that this invention is also applicable to other coherent imaging forms, such as radar, sonar, and the like. It is our intent, therefore, to be limited only by the scope of the appended claims.

What we claim is:

1. A method for iterative adaptive reduction of phase aberration effects upon the time delays needed for focusing a beam of coherent energy within non-homogeneous media at a selected range R from, and at an angle $\theta$ with respect to the normal to, the surface of an array of a plurality N of transducers, with each transducer providing a portion of the energy of the beam when excited and for thereafter converting energy incident thereon to a signal, comprising the steps of:
   (a) bouncing from scatterers, naturally contained in at least a portion of the media to be investigated, a probe originating from the plurality N of transducers;
   (b1) converting a received signal from each transducer into a digital baseband data signal;
   (b2) cross-correlating, for the first (N−1) channels, the digital baseband data signals converted form k-th transducer where $1 \leq k \leq (N-1)$, and an adjacent (k+1)-st transducer of the (N−1) successive pairs of adjacent ones of all N transducers to produce a phase conjugation correction signal $\Delta\phi_k$ from the k-th channel;
   (c) arithmetically operating upon the plurality of phase conjugation correction signals $\Delta\phi_k$ to produce a time correction $\Delta t_{j\theta}$ for a time delay associated with an angle $\theta$ and a transducer j, where $1 \leq j \leq (N-1)$, for a probe beam at that range R;
   (d) then modifying by the time correction $\Delta t_{j\theta}$ for the transducer j, both (1) the time delays for exciting a reduced aberration imaging beam in the non-homogeneous media and (2) the time delays for forming a reception beam from the media, with both beams steered substantially to angle $\theta$ and focussed substantially to range R;
   (e) repeating the sequence steps (a)–(d) for at least one additional iteration; and
   (f) then modifying, by a last-obtained time correction $\Delta t_{j\theta}$ for each transducer j, the time delay of both insonification to, and return signals received from, the media to be investigated, to reduce phase aberration in data gathered for generating a displayable image of the media.

2. The method of claim 1, wherein step (a) comprises the step of varying $\theta$ to include all of the beam angles present in a set of imaging beams stepwise scanning across a selected sector.

3. The method of claim 2, further including the step of repeating steps (a)–(f) for every repetition of any selected sequence of beam angles forming at least a part of the imaging beam set.

4. The method of claim 1 wherein step (a) comprises the step of varying $\theta$ to include only every m-th one, where m is greater than 1, of the beams produced by the N transducers in a reduced portion of a set of imaging beams; and further including the step of interpolating between the time corrections for the nearest adjacent beam stepwise scanning across a selected sector, in the reduced set for which an iterative probe beam correction value was obtained, to obtain time delay corrections for imaging beams at $\theta$ values not included in the reduced portion of the probe beam set.

5. The method of claim 4, further including the step of repeating steps (a)–(f) for every repetition of any selected sequence of beam angles forming at least a part of the imaging beam set.

6. The method of claim 1, wherein each of the baseband data signals is a quadrature at a signal having an in-phase component $I_k$ and a quadrature-phase component $Q_k$, in a like-numbered k-th channel; and the cross-correlating step includes the step of complexly multiplying the pair of quadrature data signals.

7. The method of claim 6, wherein step (b2) further includes the steps of: deriving, for each of the first (N−1) channels of the array, the $\Delta\phi_k$ data term for that channel from a trigonometric ratio of a real portion and an imaginary portion of each complexly multiplied pair of adjacent channel signals; and summing the $\Delta\phi_k$ data terms for the first channel to the j-th channel, inclusively, to provide a phase conjugation correction signal $\phi_{j\theta}$ for the j-th transducer of the array generating the probe beam.

8. The method of claim 1, wherein for each transducer 1 through (N−1), step (b2) includes the steps of: receiving an in-phase component $I_{k+1}$ and a quadrature-phase component $Q_{k+1}$ from the (k−1)-st next channel; inverting the sign of the $Q_{k+1}$ component; for each k-th channel, complexly multiplying the pair of $I_k$ and $Q_k$ data and the pair of $I_{k+1}$ and $Q_{k+1}$ data; separately accumulating the real and imaginary terms of the complex product; and providing the $\Delta\phi_k$ term, for that k-th channel, as the arctangent of the ratio of the imaginary and real sums.

9. The method of claim 1, wherein step (c) includes the steps of: summing the first to the j-th ones of the phase conjugation signals $\Delta\phi_k$ to produce a phase correction data signal $\phi_{j\theta}$; and dividing the phase correction data signal by the average frequency $\omega_o$ of the beam energy to provide the time delay $\Delta t_{j\theta}$.

10. The method of claim 1, wherein step (e) comprises the step of selecting the number L of iterations to be between 1 and 6.

11. Apparatus for iteratively adaptive reduction of phase aberration effects upon the time delays needed for focussing of a beam of coherent energy within non-homogeneous media at a selected range R from, and at an angle $\theta$ with respect to the normal to, the surface of an array of a plurality N of transducers, with each transducer providing a portion of the energy of the beam when excited and for converting energy reflected thereto to a signal; comprising:
   means for causing a probe beam from each different one of a selected sequential set of probe beams to bounce from scatterers naturally contained in at least a portion of the media to be investigated and be received by substantially all transducers of the array, and including means for converting the received signal from each k-th transducer into a digital baseband data signal;

phase conjugation processing means for cross-correlating, for each probe beam, the digital baseband data signals converted from each successive pair of adjacent k-th and (k+1)-st transducers, where $1 \leq k \leq (N-1)$, to produce for the k-th channel one of a plurality (N−1) of phase conjugation correction signals $\Delta\phi_k$;

means for arithmetically operating upon the plurality of phase conjugation correction signals $\Delta\phi_k$ to produce a time correction $\Delta t_{j\theta}$ for the time delay associated with a transducer j, where $1 \leq j \leq (N-1)$, for that range R and angle $\theta$;

means associated with each transducer for then modifying by the time correction for that transducer both (1) the time delays for exciting a reduced-aberration imaging beam in the non-homogeneous medium and (2) the time delays, for forming a reception beam from the media, with both beams steered substantially to angle $\theta$ and focussed substantially to range R;

means for causing at least one additional iteration of probe beam insonification, reflection reception and processing to further modify the time corrections for at least one transducer; and means associated with each transducer for then modifying by a last-obtained time correction $\Delta t_{j\theta}$, obtained after a selected number L of iterations, for each transducer j, the time delay of both insonification of, and return signals received from, the media to be investigated, to reduce phase aberration in data gathered for generating a displayable image of the media.

12. The apparatus of claim 11, wherein each of the baseband data signals is a quadrature data signal; and the processing means includes, for the k-th channel, means for complexly multiplying the pair of quadrature data signals from the k-th channel and the (k+)-st channel.

13. The apparatus of claim 14, wherein each k-th channel baseband quadrature data signal has an in-phase component $I_k$ and a quadrature-phase component $Q_k$; and the processing means receives the $I_k$ and $Q_k$ components from the k-th channel and the $I_{k+1}$ and $Q_{k+1}$ components from the (k+1)-st channel.

14. The apparatus of claim 13, wherein each complexly multiplying means provides separate output of the real portion and the imaginary portion of the product of $(I_k + iQ_k)$ and $(I_{k+1} - iQ_{k+1})$.

15. The apparatus of claim 14, wherein each processing means further includes: means for separately accumulating the real portion output and the imaginary portion output of the complexly multiplying means; and means for taking a trigonometric ratio of the accumulated real and imaginary portion signals to provide the phase conjugation error data signal $\Delta\phi_k$ for the k-th channel.

16. The apparatus of claim 15 wherein the arithmetically operating means includes means for summing the $\Delta\phi_k$ data signals for the first channel to the j-th channel, inclusively, to provide a phase conjugation correction signal $\phi_{j\theta}$ for the j-th transducer then providing an array contribution to a probe beam at angle $\theta$.

17. The apparatus of claim 13, wherein the processing means further includes means for inverting the sign of the $Q_{k+1}$ component.

18. The apparatus of claim 17, wherein the processing means further includes means for storing the received $I_k$, $Q_k$, $I_{k+1}$ and inverted sign $Q_{k+1}$ components.

19. A method for iterative adaptive reduction of phase aberration effects upon the time delays needed for focusing a beam of coherent energy within non-homogeneous media at a selected range R from, and at an angle $\theta$ with respect to the normal to, the surface of an array of a plurality N of transducers, with each transducer providing a portion of the energy of the beam when excited and for thereafter converting energy incident thereon to a signal, comprising the steps of:

(a) bouncing from scatterers, naturally contained in at least a portion of the media to be investigated, a probe beam originating from the plurality N of transducers;

(b) cross-correlating, for each probe beam, signals received from each k-th transducer, where $1 \leq k \leq (N-1)$, and an adjacent (k+1)-st transducer of the (N−1) successive pairs of adjacent ones of all N transducers to produce a like number (N−1) of phase conjugation correction signals $\Delta\phi_k$;

(c) arithmetically operating upon the plurality of phase conjugation correction signals $\Delta\phi_k$ to produce a time correction $\Delta t_{j\theta}$ for the time delay associated with an angle $\theta$ and a transducer j, where $1 \leq j \leq (N-1)$, for a probe beam at that range R, by first summing the first to the j-th ones of the phase conjugation correction signals $\Delta\phi_k$ to produce a phase correction data signal $\phi_{j\theta}$, and then dividing the phase correction data signal by the average frequency $\omega_0$ of the beam energy to provide the time delay $\Delta t_{j\theta}$;

(d) then modifying by the time correction $\Delta t_{j\theta}$ for the transducer j, both (1) the time delays for exciting a reduced aberration imaging beam in the non-homogeneous media and (2) the time delays for forming a reception beam from the media, with both beams steered substantially to angle $\theta$ and focussed substantially to range R;

(e) repeating the sequence steps (a)–(d) for at least one additional iteration; and (f) then modifying, by a last-obtained time correction $\Delta t_{j\theta}$ for each transducer j, the time delay of both insonification to, and return signals received from, the media to be investigated, to reduce phase aberration in data gathered for generating a displayable image of the media.

20. The method of claim 17, wherein step (a) comprises the step of varying $\theta$ to include all of the beam angles present in a set of imaging beams stepwise scanning across a selected sector.

21. The method of claim 20, further including the step of repeating steps (a)–(f) for every repetition of any selected sequence of beam angles forming at least a part of the imaging beam set.

22. The method of claim 19 wherein step (a) comprises the step of varying $\theta$ to include only every m-th one, where m is greater than 1, of the beams produced by the N transducers in a reduced portion of a set of imaging beams; and further including the step of interpolating between the time corrections for the nearest adjacent beams stepwise scanning across a selected sector, in the reduced set for which an iterative probe beam correction value was obtained, to obtain time delay corrections for imaging beams at $\theta$ values not included in the reduced portion of the probe beam set.

23. The method of claim 22, further including the step of repeating steps (a)–(f) for every repetition of any selected sequence of beam angles forming at least a part of the imaging beam set.

24. The method of claim 19, wherein step (b) includes the steps of: converting the signal received from each k-th transducer into a quadrature digital baseband data signal having an in-phase component $I_k$ and a quadrature-phase component $Q_k$; and cross-correlating, for the first (N−1) channels, by complexly multiplying the pair of k-th and (k+1)-st quadrature data signals to provide the phase conjugation error signal $\Delta\phi_k$ from the k-th channel.

25. The method of claim 24, wherein step (b) further includes the steps of: deriving, for each of the first (N−1) channels of the array, the $\Delta\phi_k$ data term for that channel from a trigonometric ratio of a real portion and an imaginary portion of each complexly multiplied pair of adjacent channel signals; and summing the $\Delta\phi_k$ terms for the first channel to the j-th channel, inclusively, to provide a phase conjugation correction signal $\phi_{j\theta}$ for the j-th transducer of the array generating the probe beam.

26. The method of claim 19, wherein step (e) comprises the step of selecting the number L of iterations to be between 1 and 6.

* * * * *